Feb. 12, 1952         C. J. GUNTHER         2,585,241
FASTENER RECEPTACLE
Filed Oct. 14, 1950

INVENTOR.
Conrad J. Gunther
BY
Daniel H. Kane
ATTORNEY

Patented Feb. 12, 1952

2,585,241

UNITED STATES PATENT OFFICE 2,585,241

FASTENER RECEPTACLE

Conrad J. Gunther, Hempstead, N. Y., assignor to Dzus Fastener Co., Inc., West Islip, N. Y., a corporation of New York Application October 14, 1950, Serial No. 190,133

2 Claims. (Cl. 24—221)

This invention relates to an improved fastener receptacle for use with a spiral cam type of fastener stud.

The spiral cam type of fastener is well-known and generally consists of a stud member and spring or receptacle member which are interengageable upon the rotation of one member with respect to another. The stud has a tubular shank portion formed with diametrically disposed spiral cam slots which terminate beyond a locking shoulder and the cam slots engage with a spring pressed locking bar on the receptacle member. Rotation of the stud in one direction causes the cam slots to draw the locking bar inwardly until it is locked behind the locking shoulders. Rotation of the stud in the opposite direction causes the locking bar to be released from behind the locking shoulders so that the parts can be readily separated.

The range of pickup of the fastener (i. e. the variations in material thicknesses which can be gripped or secured by the fastener) is determined primarily by the height of the effective portion of the spiral cam in the stud member. Generally speaking, the initial or entry portion of the spiral cam slots presents too steep a surface to effect a camming action and, accordingly, the range of pickup of the stud is limited to the height of the spiral cam beyond the initial or entry portion of the slot.

It is an object of the present invention to present an improved spiral cam fastener, particularly a fastener receptacle which will impart a greater range of pickup to the fastener assembly.

It is a further object of the invention to provide a fastener receptacle for use in the spiral cam type of fastener which will simplify the operation of the fastener and reduce the amount of torque required in locking the fastener while, at the same time, leaving the safety or self-locking characteristics of the fastener undisturbed.

In carrying out my invention I contemplate providing the receptacle with a camming surface so that upon rotation of the stud the locking bar is shifted from its initial position toward locked position not only by the spiral cam slots in the stud member but also by the camming surface provided in the receptacle per se.

Figure 2:
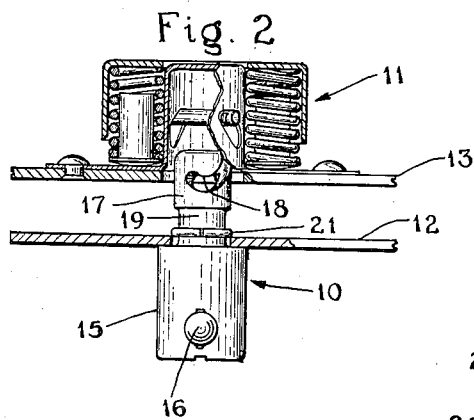
Fig. 2 is a side elevational view partly in section of a fastener assembly in unlocked position and showing the construction of my improved fastener receptacle.
Figure 3:
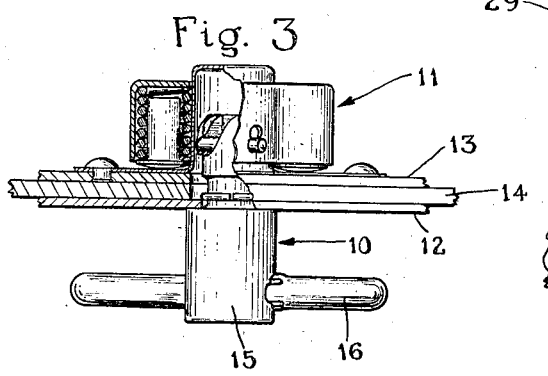
Fig. 3 is a somewhat similar side elevational view partly in section showing the fastener assembly in locked position and showing an additional plate as being secured or gripped by the fastener.
Figure 4:
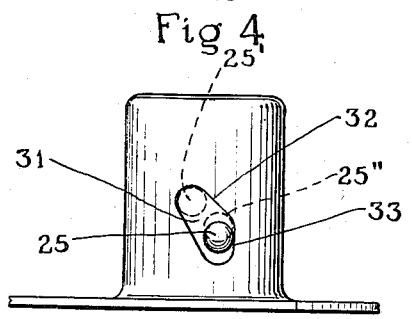
Figure 5:
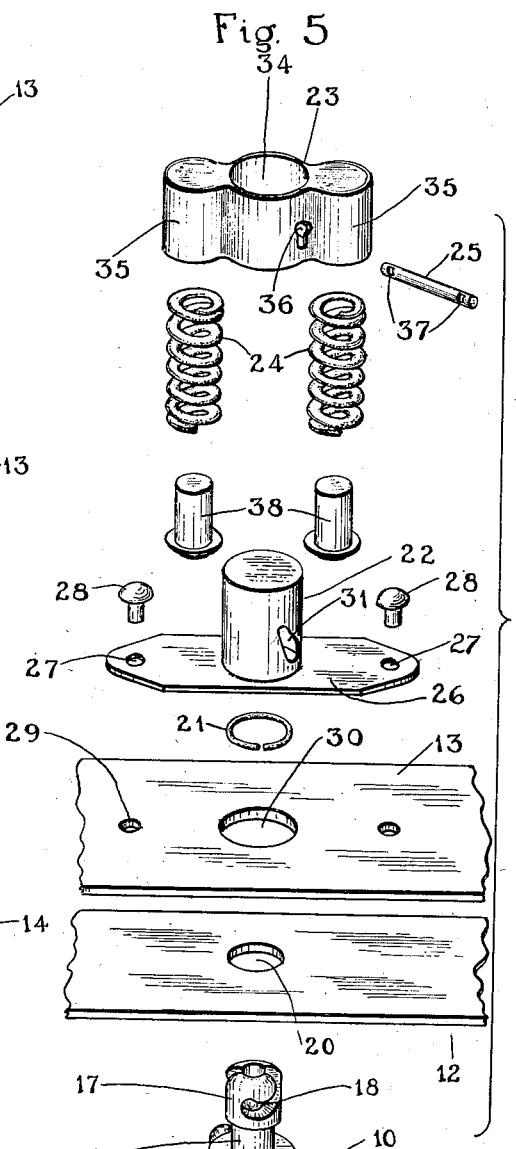

Fig. 4 is a side elevational view of the inner shell of my improved fastener receptacle fastener receptacle showing in full lines the position of the locking bar when the fastener assembly, Fig. 3, is in locked position, and also showing in dotted lines the position of the locking bar when the fastener assembly is unlocked and when the fastener assembly of Fig. 2 is in locked position; and Fig. 5 is an exploded view showing the component parts of the fastener assembly.

My improved fastener consists of a stud member 10 and a receptacle member 11 which are interengageable upon the rotation of the stud member in a clockwise direction with respect to the receptacle member and are releasable upon the rotation of the stud member in an anti-clockwise direction. The stud member is attached to a plate 12 so that it may rotate with respect thereto and the receptacle member is fixedly secured to the plate 13.

Due to my improved construction, the fastener may be used to secure together materials of varying thickness. Thus, it may be used not only for securing the plates 12 and 13 but may also be used to secure together a relatively greater pile-up of materials, as shown in Fig. 3, where the additional plate or gasket 14 is interposed between the plates 12 and 13.

The stud member 10 is one conventional form of spiral cam fastener stud and has an enlarged head 15 with a cross handle 16. At the opposite end of the stud member is the tubular shank portion 17 formed with a pair of diametrically disposed spiral cam slots 18 having locking shoulders near the inner ends. Between the head and the shank portion is a reduced neck 19.

In assembling the stud member with the plate 12, an aperture 20 is formed therein which is barely large enough to permit the shank 17 to be inserted therethrough. The shank of the stud is then inserted through the aperture so that the neck 19 is disposed in the aperture as shown in Figs. 2 and 3, and a suitable retaining member, such as the snap ring 21, is secured around the neck portion on the side of the plate 12 opposite the head of the stud. The stud member is then free to rotate but will be retained in assembled relation with the plate 12.

My improved receptacle member 11 consists of an inner shell 22 and an outer shell 23 assembled in telescopic relationship with a pair of helical springs 24 interposed therebetween and a cross bar 25 secured to the outer shell and extending across the inner shell for engagement with the spiral cam slots of the stud member.

The inner shell member 22 is formed with a base plate 26 having apertures 27 whereby the receptacle may be suitably secured as by rivets 28 to the plate 13. The plate 13 is, of course, provided with similar apertures 29 for accommodating the rivets as well as with a central aperture 30 for permitting the insertion of the stud member. The inner shell 22 is formed with a pair of diametrically opposite elongated or slot-like openings 31 which are disposed at a slight angle to the vertical and by reference to Fig. 2, it will be seen that the angles of the slots on the two sides of the shell are opposite each other. The upper edge of each slot as shown at 32 is disposed at an angle to the vertical and presents a cam-like surface for performing a camming function with respect to the locking bar 25, as will be later explained. The lower end of each edge 32 merges with a vertically disposed wall 33 formed at the lower portion of each of the slots. Since the present fastener is designed to lock when the stud member is rotated in a clockwise direction, the cam surface 32 is formed to slant downwardly in a clockwise direction as viewed from the bottom and the vertical wall 33 merges with the lower right hand end of the cam surface. If the fastener were designed to lock when the stud member is rotated in a counterclockwise direction, the cam surface and vertical wall 33 would be oppositely arranged.

The outer shell is formed with a central cylindrical portion 34, which is preferably open at the top and which receives the inner shell 22. At the two sides of the central cylindrical portion 34 are a pair of spring housings 35 which accommodate the helical springs 24. A pair of keyhole openings 36 are formed on diametrically opposite sides of the central cylindrical portion 34 and serve to accommodate and to retain in place the locking bar 25. In this connection, the locking bar is generally circular in cross section and can be inserted through the upper enlarged portion of the keyhole openings. Adjacent its two ends, the locking bar is slotted, as shown at 37, on both surfaces to form portions of reduced thickness which may be accommodated in the lower or smaller portion of the keyhole openings. Thus, the locking bar is inserted through the upper portion of the keyhole openings and is then dropped downwardly and retained in place in the lower portion of the keyhole openings.

In assembling the receptacle member, the springs 24 may first be placed in the spring housings 35 of the outer shell and then telescopically assembled with the inner shell. The shells are pressed together, compressing the springs so that the locking bar 25 may be inserted through the keyhole openings of the outer shell and the slotted openings 31 of the inner shell. The pressure on the two shells may then be released, permitting the spring to shift the outer shell outwardly with the result that the slotted portion of the cross-bar enters the reduced lower portion of the keyhole openings 36 and the locking bar is forced to the position shown in dotted lines in Fig. 4 at 25', at the upper end of the slotted openings 31.

In assembling the receptacle member, I prefer to insert a pair of bearing pins 38 into the lower ends of the helical springs so that the outer shell may more readily rotate with respect to the inner shell. It will be seen that the bearing pins have enlarged, convex heads presenting bearing surfaces.

In using my improved fastening device, the stud member is first assembled with the plate or part 12 to which it is attached in a manner previously described and the receptacle member 11 is suitably attached as by riveting to the support 13. The plates 12 and 13 may then be brought in confronting relationship and the stud inserted in the receptacle in the manner indicated in Fig. 2 until the cross bar 25 enters the outer end of the spiral cam slots 18. If the stud is then rotated in a clockwise direction, the cross bar will be caused to shift along the cam surface 32 of the inner shell 22 from the position shown at 25' in Fig. 4 towards the position shown at 25''. As the locking bar is drawn inwardly through its engagement with cam surface 32, it also engages with the cam surfaces of the spiral cam slots 18 of the stud member and the combined action of the cam surfaces on the receptacle member and the cam surfaces on the stud member causes the locking bar to finally shift to fully locked position behind the locking shoulders of the spiral cam slots.

Due to the provision of the cam surfaces on the receptacle member, a relatively wider range of material thickness can be secured by the fastener. Thus, in Fig. 2 the fastener is used to secure the plates 12 and 13 only with the result that the material thickness is relatively smaller, whereas in Fig. 3 a gasket or plate 14 has been interposed between the plates 12 and 13 presenting materials of relatively greater thickness.

Where materials of relatively greater thickness (such as illustrated in Fig. 3) are secured together, the locking bar will assume the position shown in full lines in Fig. 4 spaced intermediate the two ends of the vertical edge 33 of the slot when the fastener is locked. Where relatively thinner materials are secured together, as in the illustration shown in Fig. 2, the locking bar will be in engagement with the cam surface 32 when in locked position, as shown at 25'' in Fig. 4.

It will be seen that the extreme entrance or end portions of the spiral cam slots 18 of the stud member do not present a cam surface which ordinarily would cause the locking bar to feed inwardly when the stud member is rotated in a clockwise direction. In the absence of the cam surface 32 in the receptacle member, this factor would ordinarily serve as a limitation upon the material thickness which can be secured by the fastener. However, it will be seen that the cam surfaces 32 in the receptacle member will serve to initiate the locking action and will cause the locking bar to feed inwardly in the slots 18 of the stud member.

Figure 1:
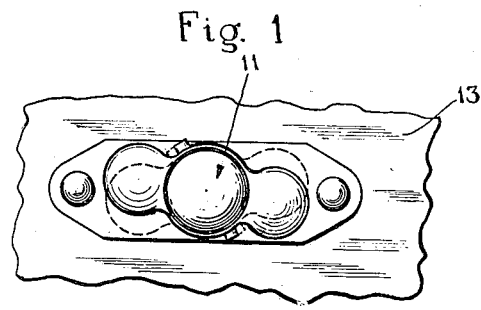
Fig. 1 is a plan view of a fastener receptacle embodying my invention showing the position of the shell, when in unlocked position, in full lines and in dotted lines when in locked position.

As the fastener member is locked, the outer shell 23 is caused to rotate with respect to the inner shell in a clockwise direction. The position of the outer shell in unlocked position is shown in full lines in Fig. 1 and in locked position is shown in dotted lines in Fig. 1.

It will thus be seen that I have provided an improved fastener, particularly an improved fastener receptacle which will impart a greater range of pick-up to the fastener assembly. It will also be seen that my improved fastener receptacle will simplify the operation of the fastener and reduce the amount of torque required in locking the fastener while at the same time leaving the safety or self-locking characteristics intact.

I claim:

1. A fastener receptacle for use with a spiral cam fastener stud comprising a shell formed with diametrically opposite openings presenting cam surfaces extending outwardly at an angle, a locking bar extending across said shell and disposed in said openings in operative relation to said cam surfaces and shiftable with respect thereto, and spring means in operative relation to said locking bar for normally shifting it towards the outer end of the cam surface.

2. A fastener receptacle for use with a spiral cam fastener comprising a first shell formed with diametrically opposite openings presenting cam surfaces extending outwardly at an angle, a second shell in telescopic relation with the first shell and shiftable with respect thereto, a locking bar carried by said second shell and extending across said first shell, said locking bar being disposed in said openings in said first shell in operative relation to said cam surfaces and shiftable with respect thereto and spring means interposed between said shells so as normally to shift said second shell and locking bar to a position where the locking bar is disposed adjacent the outer end of the cam surface.

CONRAD J. GUNTHER.

REFERENCES CITED

The following references are of record in the file of this patent:

UNITED STATES PATENTS

| Number | Name | Date |
|---|---|---|
| 2,104,057 | Dorgeleys | May 28, 1946 |
| 2,499,574 | Dzus | Mar. 7, 1950 |